United States Patent

[11] 3,573,636

| [72] | Inventor | Uve H. W. Lammers<br>Watertown, Mass. |
|---|---|---|
| [21] | Appl. No. | 790,955 |
| [22] | Filed | Jan. 14, 1969 |
| [45] | Patented | Apr. 6, 1971 |
| [73] | Assignee | The United States of America as represented by the Secretary of the Air Force |

[54] MULTIPLICATIVE PROCESSING PHASE DETECTOR
2 Claims, 2 Drawing Figs.

[52] U.S. Cl. .................................................. 329/110, 329/145
[51] Int. Cl. .................................................. H03d 3/00

[50] Field of Search .................................................. 328/133, 144; 329/110, 145

[56] References Cited
UNITED STATES PATENTS

| 2,900,137 | 8/1959 | Giser | 328/144X |
| 3,219,938 | 11/1955 | Greening | 328/133 |

Primary Examiner—Roy Lake
Assistant Examiner—Lawrence J. Dahl
Attorneys—Harry A. Herbert, Jr. and Henry S. Miller, Jr.

ABSTRACT: A nonintegrating frequency or phase detector utilizing a plurality of square law detectors in a circuit having sinusoidal input signals and generating a DC output signal as a function of the phase angle difference between the input signals.

MULTIPLICATIVE PROCESSING PHASE DETECTOR

BACKGROUND OF THE INVENTION

This invention relates generally to phase and frequency detectors, and more specifically to those detectors which provide continuous phase information with two input signals, or frequency information with a single input signal.

For precision satellite tracking purposes as well as other terrestrial navigation systems a two-antenna configuration receiving linearly frequency modulated signals from a distant transmitter offers a means of determining the angle of arrival $\alpha$ with respect to the system baseline. The resolution of such a system can be made high since it is proportional to the antenna separation s and no ambiguities arise for antenna separations greater than the range of wavelengths recieved. When heterodyned against each other, the antenna signals yield a difference frequency $\omega$ which is proportional to the time delay of the two signals arriving at the antennas. With the other system parameters fixed, $\omega$ is a simple function of $\alpha$ and not affected by the transmitter distance. High angular resolution requires an adequate linearity of the sweep signal.

The instant invention can be used as part of a linearization circuit, but is is not restricted to this application; it is rather a device for continuously detecting phase and frequency changes and may be utilized in almost any case where continuous phase information is required. Some applications require a continuous phase information which cannot be achieved by a peak detecting and integrating phase detector generally in use. Thus, the linearity of a linearly frequency modulated signal (frequency change per unit time $d\omega/dt$ = constant) can be monitored by generating the difference frequency $\omega$ from the actual signal and a replica delayed by a fixed time interval $t$. Changes in $d\omega/dt$ yield a change in the difference frequency $\omega$. Comparing the phase of the difference frequency with a reference in a nonintegrating phase detector and feeding a compensating signal proportional to the phase error back into the frequency modulator results in an improved sweep linearity.

SUMMARY OF THE INVENTION

The instant invention provides a new and improved means for detecting frequency and phase changes on a continuing basis. As a result of this invention, it is now possible to detect phase changes with greater speed than hitherto known, and accordingly that is an object of this invention.

It is another object of this invention to provide a new and improved frequency detector.

It is a further object of this invention to provide a new and improved detector that will monitor phase and frequency changes on a continuous basis.

It is still a further object of this invention to provide a detector of phase or frequency that is not dependent on signal peaks and integrating times.

It is another object of this invention to provide a new and improved detector which is lightweight, compact, and reliable.

It is another object of this invention to provide a phase or frequency detector which is economical to produce and utilizes conventional, currently available components that lend themselves to standard, mass-production manufacturing techniques.

It is another object of this invention to provide a detector that is capable of being transformed from a phase to a frequency detector by merely switching one input signal.

It is another object of this invention to provide a detector that provides a direct current output indicative to the change in phase angle or frequency.

These and other advantages, features and objects of the invention will become more apparent from the following description taken in connection with the illustrative embodiment in the accompanying drawings.

DESCRIPTION OF THE PREFERRED EMBODIMENT

Figure 1:
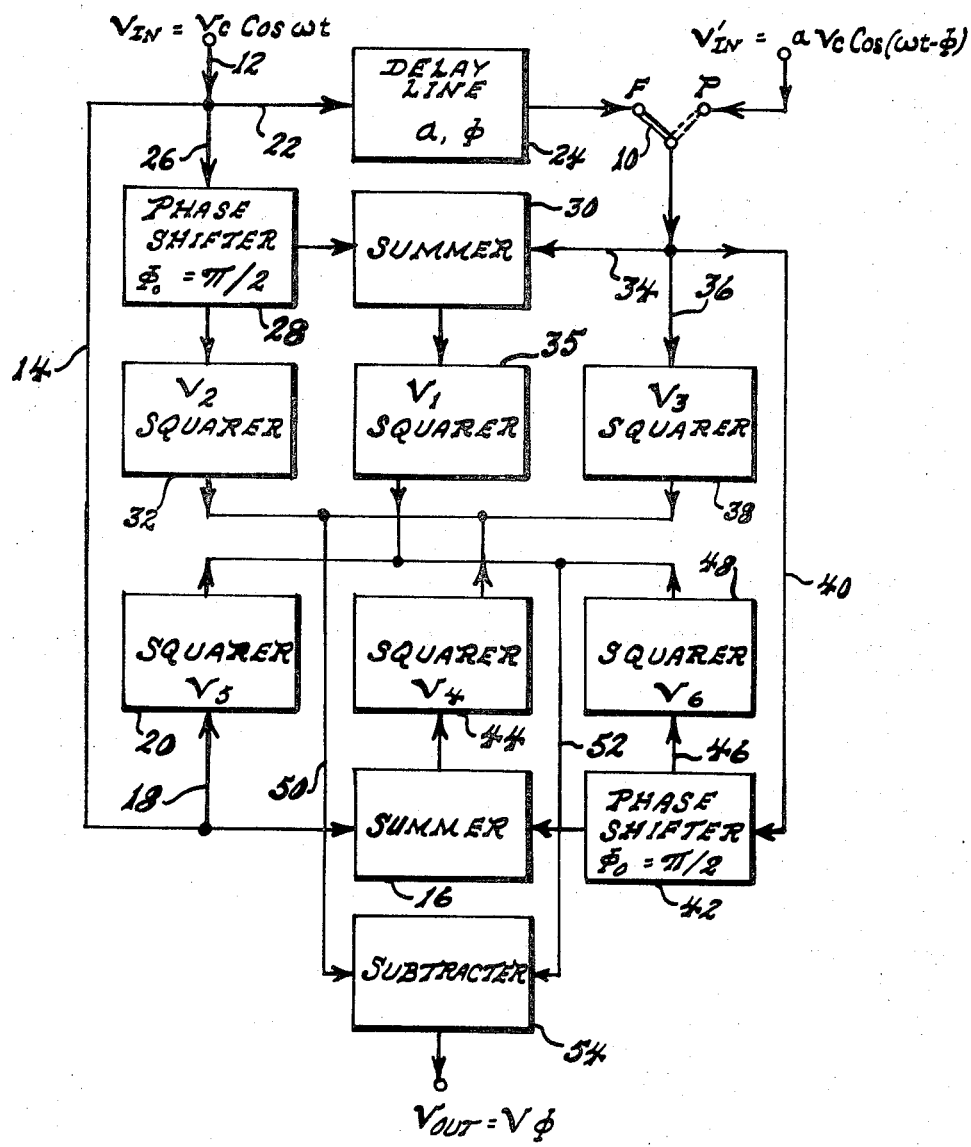
FIG. 1 is a block diagram of the invention.

Referring to FIG. 1, when the switch 10 is in the P position, as shown in phantom, the system is adapted to phase detection. The input signal is arithmetically defined as $V_{in}=V_c\cos\omega t$ where $V_c$ is a voltage constant, $\omega$ an angular frequency, and $t$ the time. The input is directed two ways when it enters the circuit via line 12. The signal is sent through line 14 where it is further directed to a summer 16 and through line 18 to squarer 20 where the input signal $V_5=VV_c\cos\omega t$ is squared.

The original signal is further fed via line 26 to a phase shifter 28 which shifts the phase of the signal $\Phi=\pi/2$ or 90° independent of frequency. The phase shifted signal is then sent to the summer 30 and the square law detector 32 where the input signal takes the form of $V_2=V+V_s\sin\omega t$ where $V_s$ is the phase shifted voltage and the output signal is $V_2^2$.

The second input signal takes the form of $V^1_{in}=aV_c\cos(\omega-\Phi)$. The second input goes through the switch 10 and is sent to three components. First, it is sent via line 34 to the summer 30 where it is added to the phase shifted input signal. The Output of the summer 30, $V_1=VV_s\sin\omega t+aV_c\cos(\omega t-\Phi)$ is then squared at 35 where the signal becomes $V_1^2$. It is distributed via line 36 to the squarer 38 where the input signal of the form $V_3=V+aV_c\cos(\omega t=\Phi)$ is squared. Next, the signal is sent via line 40 to the phase shifter 42 where it too is phase shifted 90° or $\Phi=\pi/2$. The output of the phase shifter is sent to the summer 16 where the signal is added to the original input signal and the sum is directed to the squarer 44 where it is squared and takes the form $V_4^2=[V+V_c\cos\omega t+aV_s\sin(\omega t-\Phi)]^2$.

The signal from the phase shifter 42 is likewise sent via line 46 to the square law detector 48 where the input signal $V_6=V+aV_s\sin(\omega t-\Phi)$ is again squared.

Many multiplying devices will function only with an input voltage of a particular polarity, therefore a DC voltage has been added to this system and a corresponding term $V$ is added to all partial signals in the formulas before they are squared. This then insures that $V_1$ through $V_6$ will be equal to or less than zero or alternatively equal to or greater than zero, thereby insuring uniformity in polarity.

The outputs from the squarers (original and synthesized) are then fed via line 50 and 52 to the subtractor. After squaring, an operation is performed whereby the output of the subtractor, in phase detection, takes the form $V$ $V_1^2+V_5^2+V_6^2-(V_2+V_3^2+V_4^2)=2aV_cV_s\sin\Phi$. All other DC terms and the AC terms containing $\omega$ or $2\omega$ cancel. $V_\Phi$ is proportional to the product of the input voltages $V_c$, $V_s$.

Depending on the direction of the deviation from the zero phase angle $\Phi=n\pi$ (where $n$ is an integer), the output voltage is positive or negative. There is a 180° phase shift between the output voltages for successive values of $n$.

Alternatively, if switch 10 is in position F the detector is adapted for frequency detection. The original signal $V_{in}$ is further sent through line 22 to a delay line 24 which introduces an amplitude factor $a$ and a phase angle $\Phi$ into the signal causing a phase shift and the output to be in effect a second input signal. The signal is squared, summed, and subtracted in the same manner as described with regard to the phase detection aspect.

Figure 2:
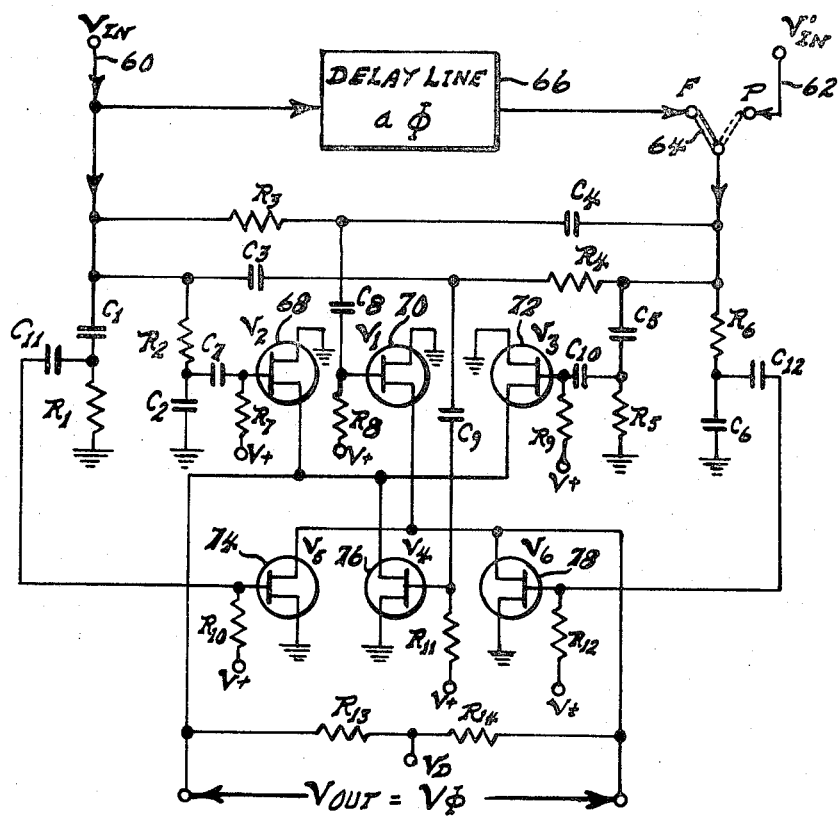
FIG. 2 is a circuit diagram of the invention.

Concerning now FIG. 2, the signal enter via lines 60 and 62 when the switch 64 is in the P position. A single signal enters via line 60 in the frequency detection mode. The delay line 66 is utilized for the frequency detection aspect of the invention.

The combination of six resistors, $R_1$, $R_2$, $R_3$, $R_4$, $R_5$, and $R_6$, of equal value, combine with six capacitors $C_1$, $C_2$, $C_3$, $C_4$, $C_5$ and $C_6$ of equal value to form an RC network which performs the function of the summers 16 and 30 and the phase shifters 28 and 42.

Field effect transistors 68 through 78 are used to square the signals. The resistors $R_7$ through $R_{12}$ are gate resistors and when combined with gate capacitors $C_7$ through $C_{12}$ permit the DC voltage $V+$ in. The resistors $R_{13}$ and $R_{14}$ are drain resistors coupled in series with the drain supply voltage $V_d$.

Although the invention has been described with reference to a particular embodiment, it will be understood to those skilled in the art that the invention is capable of a variety of alternative embodiments within the spirit and scope of the appended claims.

I claim:

1. A multiplicative processing phase detector comprising: means for accepting a first input signal; means connected to the accepting means for squaring the first input signal; means connected to the accepting means for shifting the phase of the first input signal; means accepting a second input signal; means connected to the accepting means for squaring the second input signal; means connected to the accepting means for shifting the phase of the second input signal; a first summing means for summing a first phase shifted input signal and a second input signal; a second summing means for summing a first input signal and a second phase shifted input signal; means for squaring the output of the first and second summing means and connected thereto, and means connected to the summing output squaring means, for producing a voltage output proportional to the phase difference between the first input signal and second input signal.

2. A multiplicative processing frequency detector comprising means for accepting an input signal; means associated with the accepting means for squaring the input signal; means associated with the accepting means for shifting the phase of said input signal; delay line means associated with the acceptance means for delaying the input signal; means associated with the delay line for squaring the delayed signal; means associated with the delay line for phase shifting the delay signal; an associated first summing means for summing the phase shifted input signal and the delayed input signal; a second associated summing means for summing the input signal and phase shifted delayed input signal; means for squaring the output of the first and second summing means and connected thereto, and, means operatively associated with the summing output squaring means for producing a voltage output proportional to the frequency difference between the input signal and the delayed input signal.